(12) United States Patent
Bone

(10) Patent No.: US 7,721,450 B2
(45) Date of Patent: May 25, 2010

(54) BLADE CLAMP FOR RECIPROCATING SAW

(75) Inventor: Graham Bone, Carrville (GB)

(73) Assignee: Black & Decker Inc., Newark, DE (US)

( * ) Notice: Subject to any disclaimer, the term of this patent is extended or adjusted under 35 U.S.C. 154(b) by 692 days.

(21) Appl. No.: 11/528,151

(22) Filed: Sep. 27, 2006

(65) Prior Publication Data

US 2007/0101587 A1   May 10, 2007

(30) Foreign Application Priority Data

Oct. 28, 2005 (GB) .............................. 0521932.4

(51) Int. Cl.
*B23D 49/00* (2006.01)
(52) U.S. Cl. ................... 30/392; 30/394; 83/699.21
(58) Field of Classification Search .............. 30/392, 30/394, 334–338; 279/76, 79, 87; 403/318, 403/319, 355; 83/699.21
See application file for complete search history.

(56) References Cited

U.S. PATENT DOCUMENTS

| 2,852,874 | A | * | 9/1958 | Grubb .......................... 37/457 |
| 3,252,721 | A | * | 5/1966 | Weasler ....................... 403/318 |
| 3,323,816 | A | * | 6/1967 | Meibuhr ....................... 403/355 |
| 3,698,748 | A | * | 10/1972 | Petri ............................ 403/328 |
| 3,952,433 | A | * | 4/1976 | Heinold et al. ................ 37/457 |
| 4,240,204 | A | * | 12/1980 | Walton et al. ................. 30/393 |
| 5,199,318 | A | * | 4/1993 | Hudson ........................ 74/595 |
| 5,765,301 | A | * | 6/1998 | Clendenning ................. 37/457 |
| 6,092,958 | A | * | 7/2000 | Gale ............................ 403/378 |
| 6,585,458 | B1 | * | 7/2003 | Fontaine ..................... 407/29.1 |
| 6,893,026 | B2 | * | 5/2005 | Yoshimura et al. ............ 279/81 |
| 7,234,243 | B2 | * | 6/2007 | Tam et al. ..................... 30/393 |
| 7,254,892 | B2 | * | 8/2007 | Walker ......................... 30/392 |
| 7,437,824 | B2 | * | 10/2008 | Chreene et al. ................ 30/377 |

FOREIGN PATENT DOCUMENTS

| EP | 0792713 A2 | 9/1997 |
| EP | 1649959 A | 4/2006 |
| GB | EP 792713 A2 * | 9/1997 |
| JP | 2002326121 A | 11/2002 |
| JP | 2002346829 A | 12/2002 |

* cited by examiner

*Primary Examiner*—Jason Daniel Prone
*Assistant Examiner*—Jennifer Swinney
(74) *Attorney, Agent, or Firm*—Kofi Schulterbrandt; Scott B. Markow; Adan Ayala

(57) ABSTRACT

The present invention provides a blade clamp for an electrically powered reciprocating saw. The clamp is arranged to eliminate, or at least reduce, misalignment of a blade during use with the cut direction and the longitudinal axis of a jigsaw. Thus, so-called "crabbing" of the jigsaw can be reduced, thereby increasing the accuracy with which an operator can use the jigsaw. This is achieved by modifying the blade retaining pin such that it comprises a radial protrusion which engages with or locates in a cooperating groove disposed on the clamp body. Arranging the groove and protrusion to have an engagement surface (as opposed to a point of contact) further improves on lateral stability of the pin with respect to a reciprocating shaft of the saw.

14 Claims, 5 Drawing Sheets

BLADE CLAMP FOR RECIPROCATING SAW

FIELD OF THE INVENTION

This invention relates to a blade clamp device for a hand-held motor driven reciprocating saw. The invention is described herein with reference to jigsaws, but is not considered to be limited to this particular type of saw. Indeed, the blade clamp described below can equally find use on any other type of reciprocating saw.

BACKGROUND OF THE INVENTION

Blade clamp devices for reciprocating saws are well known in the art. The clamp is used to fix the saw blade to a reciprocating shaft of the saw. The shaft is driven by an electric motor through a gearbox which converts rotary motion of the motor rotor into linear motion. Typically these types of saws comprise a body housing the motor thereby providing means by which the saw can be hand-held. The body of the jigsaw has a longitudinal axis which is generally in-line with the cut direction of the saw blade disposed in the clamp. The motor is generally powered by mains supplied electricity or rechargeable battery.

There are many types of clamping devices available for use on jigsaws. Typically the clamps fall into two categories, namely tool-operated clamps where a tool is required to fix and release the blade to or from the clamp, and tool-free clamps which can be operated by hand. Tool-free clamp devices are generally considered advantageous for jigsaws because the blade can be removed and replaced with relative ease and without the user having to put the tool down and/or find a clamp-release tool.

EP719610A1 and EP792713A2 (which are hereby incorporated in full by reference) both describe tool-free blade clamping devices. Referring to FIGS. 1 and 2, a saw blade clamp comprises a body 3 and a releasable clamping device. The saw blade clamp is shown mounted to a reciprocating shaft 9 of a jigsaw (not shown). The saw blade 11 used for cutting workpieces is held in the clamp 1 by means of the releasable clamping device.

The body 3 has a substantially T-shaped cross section, as shown in FIG. 2. Three sides of a channel 13 are defined in the top of the T, the fourth side of the channel 13 being closed by the reciprocating shaft 9. As can be seen in FIG. 2, the reciprocating shaft 9 includes a V-shaped longitudinal groove 15 which receives an edge of the saw blade 11 to assist in correctly aligning the saw blade 11 for cutting.

The side of the channel 13 opposite to the V-shaped groove 15 is partially open to allow access to the saw blade 11 within the channel 13. Hence, a roller or pin 17 forming part of the releasable clamping device 5 can contact an edge of the saw blade 11. The pin 17 is carried by two torsion springs 19 which are mounted on either side of the channel 13. Each of the torsion springs 19 includes (i) a hooked end 21 engaging a seat 23 forming part of the body 3, (ii) a first helical portion 25 in torsion and (iii) a second helical portion 27 surrounding an end of the pin 17.

The releasable clamping device 5 also includes a substantially U-shaped cross section release device 30. The release device is pivotably connected adjacent ends of the U to opposite surfaces of the body 3, one of which pivots is shown at 32. Each projection on the U comprises an elongate aperture 34 which slidably receives an end of the pin 17. The release device is provided with a colour which is easily distinguishable from the body of the clamping device, so that the device can be readily identified by a user of the jigsaw.

As can be seen in FIG. 1, the pin 17 is arranged to travel in a track 36 formed in the leg of the T-shaped body 3. Hence, if the release device 30, which forms a lever, is pivoted upwards about the pivot 32, the pin 17 is moved away from the saw blade 11, thereby releasing the saw blade 11. Withdrawal of the saw blade 11 can then be affected. Conversely, when the release device is released, the torsion springs 19 urge the pin 17 downwards towards the channel 13 and into contact with the saw blade 11. Clamping or gripping of the saw blade 11 between the pin 17 and the reciprocating shaft 9 is thereby achieved to prevent removal of the saw blade 11 during use of the jigsaw.

As can be seen in FIG. 2, the pin 17 is provided with a circumferential groove 33 which receives the saw blade 11 to assist in aligning the saw blade 11 for cutting. Further, as a result of being cylindrical, the pin can roll along the edge of the saw blade 11 during clamping or release of the saw blade.

However, this type of blade clamp has problems associated therewith; for instance, the pin can move laterally with respect to the reciprocating shaft during use. This lateral movement causes the blade to be misaligned to the longitudinal axis of the jigsaw body, which in turn causes the jigsaw to "crab".

So-called crabbing occurs when the user has to off-set the alignment of the jigsaw's longitudinal axis with respect to the direction of cut of the blade in order to maintain a straight cut along the intended cut-line. In other words, if the user does not make a compensatory adjustment but maintains the jigsaw's longitudinal axis in alignment with the intended direction of cut, then a misaligned blade (and hence the executed cut in a work piece) wonders from the cut-line. Crabbing is undesirable because the user's perception of the direction in which the jigsaw is cutting can become confused. As a result, the user might have to concentrate on the job in hand, making constant adjustment to the alignment of the jigsaw's body in order to maintain a straight and accurate cut; the cutting action of a crabbing jigsaw can feel unnatural to the user.

FIG. 3 illustrates how misalignment of the blade axis to the blade clamp's body 3, and hence the reciprocating shaft 9, can cause crabbing. FIG. 3 shows only those components of the blade clamp which are relevant for the illustration of crabbing and various components have been omitted for clarity reasons. The pin 17 is held in position by a washer 40, 40' and circlip 42, 42'. A degree of tolerance is required between the spacing of the circlips and the width of the clamp body in order to maintain fitment of the pin into the clamp track. As a result, the pin does not exactly fit the clamp body and lateral movement of the pin, as indicated by arrow A is possible.

FIG. 3 shows a situation where the pin is clamping a blade 11. The pin has moved to an extreme position within the confines on the circlip and washer arrangement such that the washer 40'on the left hand side is on engagement with the clamp body 3. As a result, the cut direction X of the blade 11 is not longer aligned to the axis Z of the clamp body (and hence the reciprocating shaft) by angle α. Thus, the jigsaw blade will wonder from the cut-line. In order to compensate for this wondering, the operator has to angle the jigsaw body thereby realigning the cut direction with the cut-line.

BRIEF SUMMARY OF THE INVENTION

The present invention aims to ameliorate the problems associated with the prior art. In summary, the present invention provides an electrically operated hand held reciprocating saw comprising, a motor housed in a housing, the motor having a drive spindle coupled to a gearbox arranged to convert rotary motion of the drive spindle into reciprocating motion of a gearbox shaft, and a blade clamp arranged for gripping a saw blade, wherein the blade clamp comprises a body defining a channel for accommodating a saw blade, and a pin carried by a spring mounted on the body, the spring being arranged to urge the pin towards an active position within the channel to retain a saw blade in the channel, and the pin comprises a groove arranged to engage with an edge of a saw blade; characterised in that a rear surface of the channel adjacent to the pin comprises an edge, a conduit or a rib arranged to engage with a protrusion or the groove disposed on the pin respectively. Thus, lateral movement of the pin is reduced or eliminated by the engagement and cooperation of the pin's protrusion or groove with a component of the clamp body.

The present invention also provides an electrically operated hand held reciprocating saw blade clamp comprising; a body defining a channel for accommodating a saw blade, and a pin carried by a spring mounted on the body, the spring being arranged to urge the pin towards an active position within the channel to retain a saw blade in the channel, and the pin comprises a groove arranged to engage with an edge of a saw blade; characterised in that a rear surface of the channel adjacent to the pin comprises an edge, a conduit or a rib arranged to engage with a protrusion or the groove disposed on the pin respectively. Thus, lateral movement of the pin is reduced or eliminated by the engagement of a feature of the pin with a component of the clamp body.

Preferably, the conduit has sidewalls angled by angle A with respect to a base portion of the conduit such that the width of the conduit decreases towards the base portion. The protrusion disposed on the pin comprises side sections angled by angle B with respect to longitudinal axis of the pin such that the width of the protrusion increases towards the pin. Preferably, angle A is equal to angle B thereby resulting in a surface or line contact between the protrusion and the conduit. This can reduce wear of the protrusion as is moves against the walls of the conduit during blade clamping and releasing. Furthermore, this arrangement provides a means for seating the pin against the clamp body thereby preventing the pin from wobbling in the clamp.

Preferably, engagement of the protrusion and conduit prevents lateral movement of the pin in the channel, during use. Lateral movement could be minimised or eliminated with this arrangement.

Preferably, the pin is separated from the rear surface when protrusion engages with the conduit, during use thereby reducing or minimising wear of the pin during use.

BRIEF DESCRIPTION OF THE INVENTION

An embodiment of the present invention is now described by way of example and with reference to the accompanying drawings, in which.

DETAILED DESCRIPTION OF THE INVENTION

Figure 1:
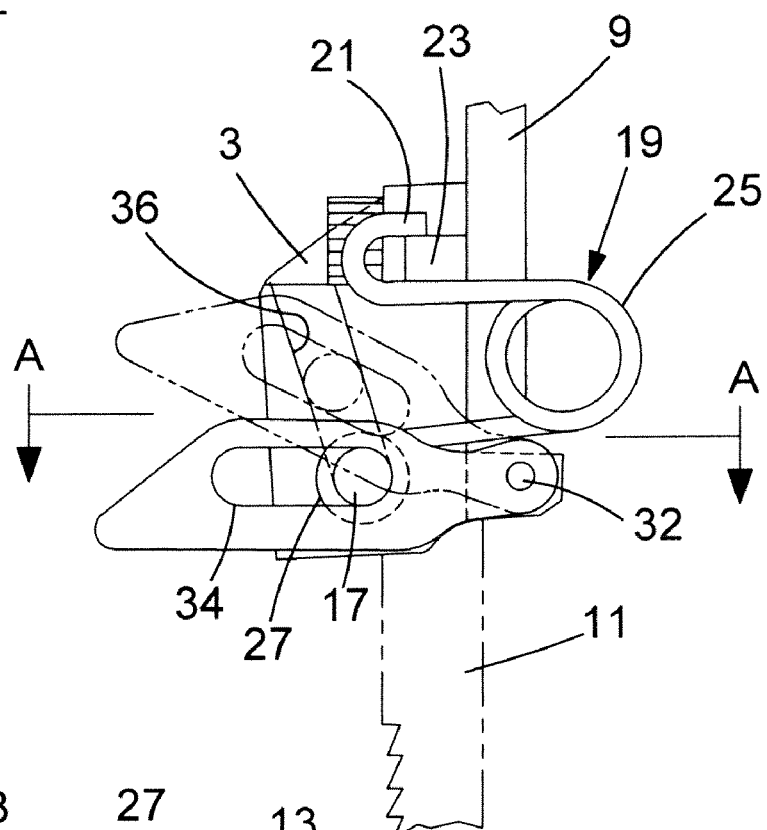
FIG. 1 shows a blade clamp known in the art.
Figure 2:
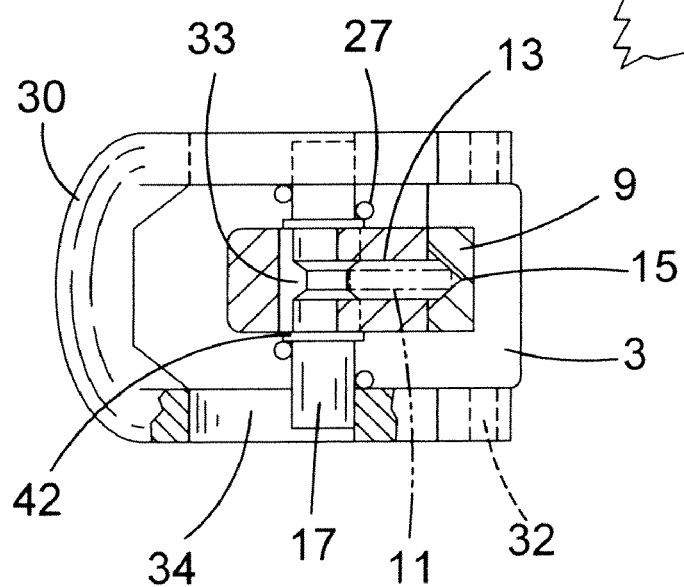
FIG. 2 shows a cross-section of the blade clamp shown in FIG. 1 along line AA.
Figure 3:
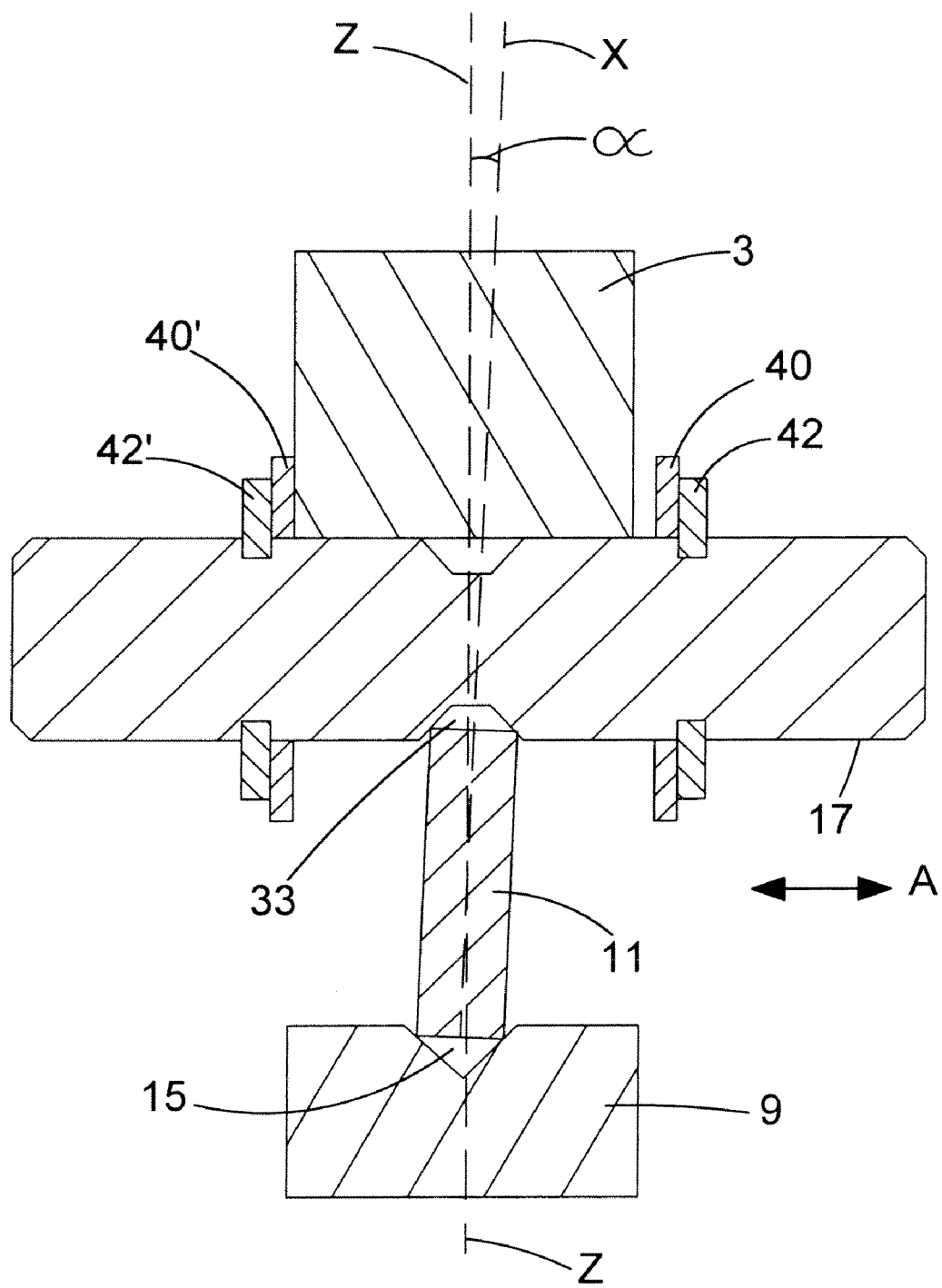
FIG. 3 shows, in schematic form, a cross-section of the blade clamp shown in FIG. 1.
Figure 4:
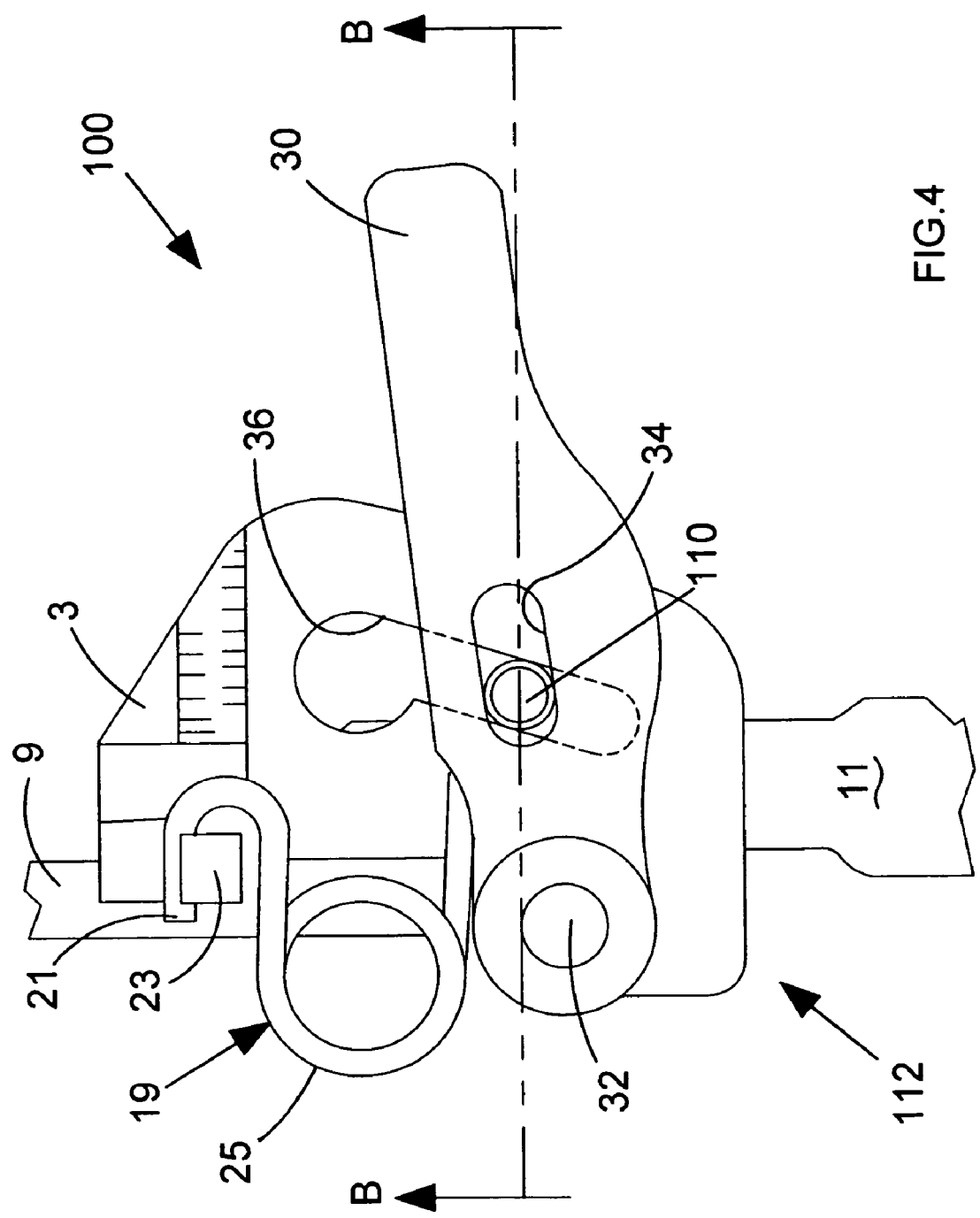
FIG. 4 shows, in schematic form, a blade clamp embodying the present invention.
Figure 5:
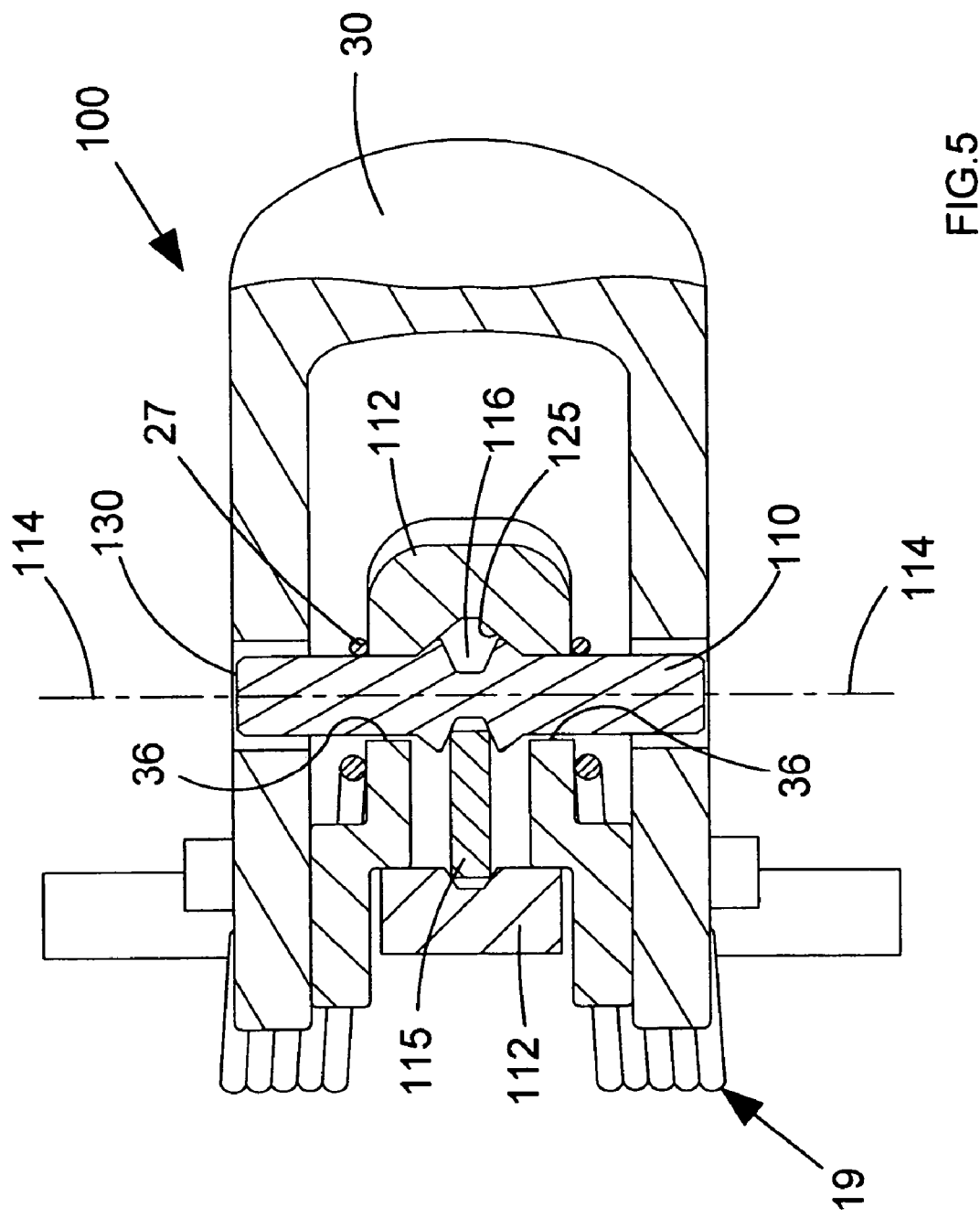
FIG. 5 shows, in schematic form, a cross-section along line BB of components of a blade clamp shown in FIG. 4.
Figure 6:
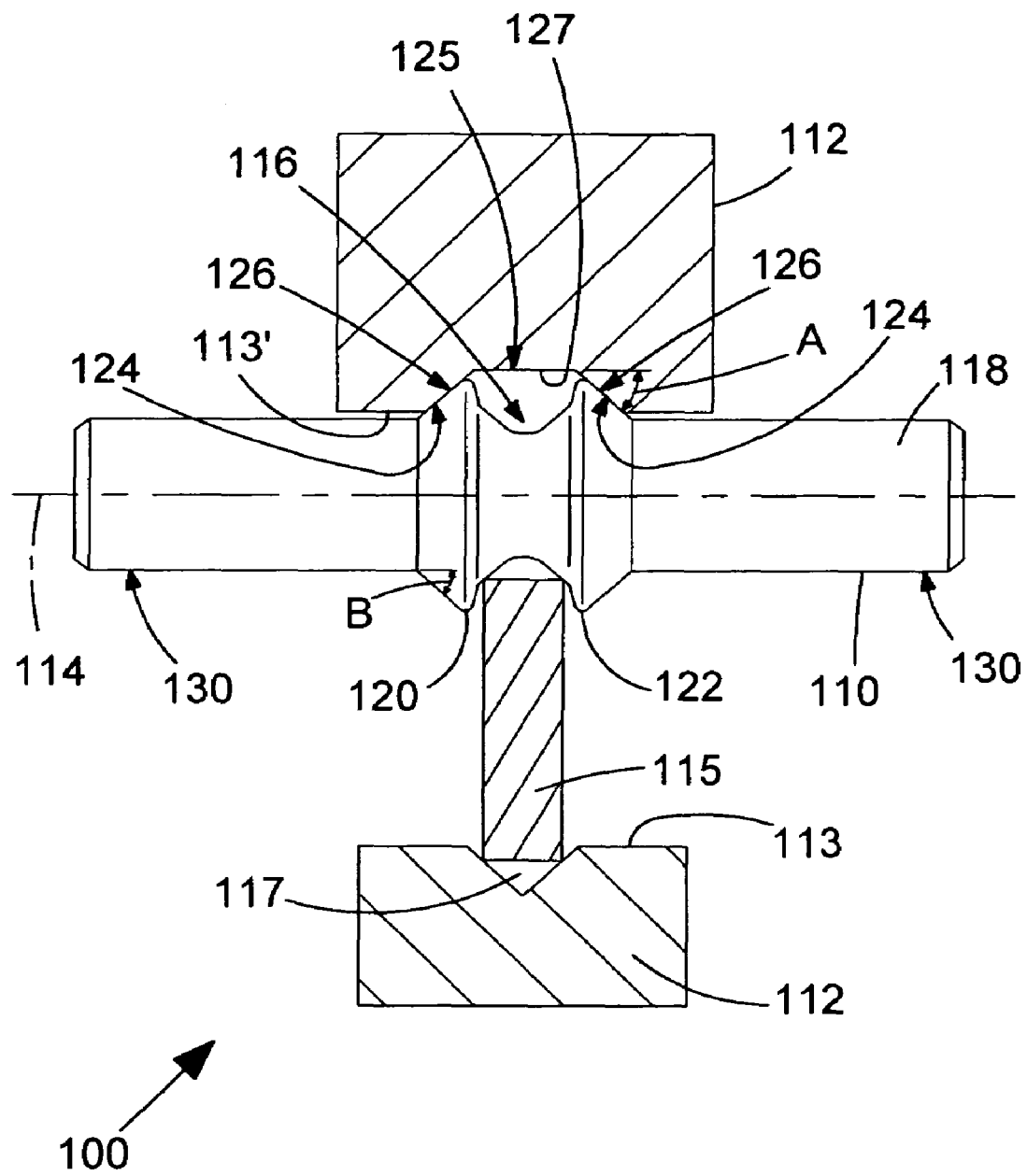
FIG. 6 shows, in schematic form, some components of the blade clamp of FIG. 4 and 5 embodying the present invention.

FIGS. 4, 5 and 6 use the same numbers to indicate components shown in FIGS. 1, 2 or 3 and which are common with the prior art.

Referring to FIG. 4, a blade clamp 100 embodying the present invention is shown. The clamp operates in a similar manner to the clamp described in EP792713A2, at least insofar as the manual release mechanism and clamping principles are concerned. However, the blade retaining pin 110 and clamp body 112 have been redesigned to reduce or eliminate lateral pin movement with respect to the reciprocating shaft.

Referring to FIGS. 5 and 6 (FIG. 6 shows only some components of the clamp 100), the clamp body 112 comprises two surfaces, a front surface 113 which comprises a channel 117 running along the surface arranged to receive an edge of a cutting blade, and a rear surface 113' which comprises a groove 125 running along the surface arranged to receive a portion of the pin 110. The pin 110 comprises a longitudinal axis 114. A radial groove 116, for receiving and accommodating an edge of a blade 115, is formed in the centre portion of the pin. On either side of the groove 116, radial protrusions 120 and 122 are formed. Each protrusion is arranged to have a peak and sloping surface 124 which meets the main body 118 of the pin 110.

Each end 130 of the pin extends from the clamp body 112 and the ends of the pin 110 engage with a spring 19 and lever release mechanism 30 for operation of the clamp device 100. Furthermore, the pin runs in a slot in the clamp body during use, much the same as the prior art blade retaining pin arrangement.

The sloping surfaces 124 of the pin 110 are arranged to engage and cooperate with side walls 126 of a conduit or channel 125 formed in the clamp body 112. Both of the sloping surface and side walls are angled by angles A and B, with respect to the longitudinal axis 114 of the pin and the base portion 127 of the channel 125 respectively. During use, the base portion is arranged to be parallel with the longitudinal axis 114 of the pin 110. The angles A and B should be chosen such that A=B. Thus, during use, the pin's sloping surface contacts the side wall over an area, as opposed to a point contact. This advantageously results in lower wear rates of the pin's sloping surface and side walls. Furthermore, by arranging the sloping surfaces and side walls in this way, the pin locates itself in alignment with the blade and cut direction such that the longitudinal axis of the pin is perpendicular to the cut direction. In other words, the pin will naturally slot into the groove through the interaction and cooperation of the sloping surfaces and groove sidewalls. Further, a force exerted by the spring urges the pin into the groove when a blade is disposed in the clamp body.

The pin is arranged so that only the sloping surfaces contact the groove sidewalls during proper use; the main body 118 of the pin 110 is held away from the clamp body 112. Thus, the location of the pin within the clamp body is maintained with a relatively high degree of accuracy and the likelihood of lateral movement of the pin along its longitudinal axis is minimised or reduced. As a result, the blade is maintained in accurate alignment within the clamp body during cutting operations and crabbing caused by blade misalignment is minimised.

Preferably, the groove 116 and slot 117 of the clamp body in which the blade is accommodated are formed with generally V or U shaped cross-sections. Alternatively, truncated V shaped cross-section might be used. In other words, the groove is triangular or trapezoidal in cross-section. This arranged can reduce stresses in associated parts during use. The pin should be made of hardened or tempered material to reduce the likelihood of groove 116 becoming worn by continued insertion and removal of a blade into the clamp 100. Such wear can result in the clamp force exerted on the blade reducing to an extent that the blade no longer remains clamped during operation of the saw.

Alternative embodiments will be envisaged by the skilled person. For instance, the protrusions 120 and 122 can be located further towards the ends 130 of the pin such that an edge of the clamp body, or the slot 36 in which the retaining pin is held, is engaged by the protrusions. Further still, the clamp body 112 might be arranged to include a ridge on its rear surface 127 to engage with the pin's groove 116, the edges of the ridge being arranged to engage with side walls of the groove. Yet further still, the slot 117 can be formed in the reciprocating shaft of the saw.

What is claimed is:

1. An electrically operated hand held reciprocating saw comprising:
    a motor housed in a housing, the motor having a drive spindle coupled to a gearbox arranged to convert rotary motion of the drive spindle into reciprocating motion of a shaft; and
    a blade clamp disposed on the shaft and being arranged for gripping a saw blade,
    wherein the blade clamp comprises:
        a body defining a channel for accommodating the saw blade; and
        a retaining member coupled to a spring mounted on the body, the spring being arranged to urge the retaining member towards an active position in the channel to retain the saw blade in the channel;
        the retaining member comprises a groove arranged to engage with an edge of the saw blade when the saw blade is disposed in the channel,
        wherein a rear surface of the channel adjacent to the retaining member comprises a surface arranged to engage with a protrusion disposed on the retaining member or the groove respectively during use.

2. The reciprocating saw of claim 1, wherein the channel has sidewalls angled by an angle A with respect to a base portion of the channel such that the width of the channel decreases towards the base portion.

3. The reciprocating saw of claim 2, wherein the protrusion disposed on the retaining member comprises side sections angled by an angle B with respect to a longitudinal axis of the retaining member such that the width of the protrusion increases towards the retaining member.

4. The reciprocating saw according to claim 3, wherein the angle A is substantially equal to the angle B.

5. The reciprocating saw of claim 4, wherein engagement of the protrusion and the channel prevents lateral movement of the retaining member in the channel during use.

6. The reciprocating saw of claim 1, wherein the retaining member is separated from the rear surface when the protrusion engages the channel during use.

7. The reciprocating saw of claim 1, wherein the groove has a triangular or trapezoidal cross-section.

8. An electrically operated hand held reciprocating saw blade clamp comprising:
    a body defining a channel for accommodating a saw blade; and
    a retaining member coupled to a spring mounted on the body, the spring being arranged to urge the retaining member towards an active position within the channel to retain a saw blade in the channel, and the retaining member comprises a groove arranged to engage with an edge of a saw blade,
    wherein a rear surface of the channel adjacent to the retaining member comprises a conduit or rib arranged to engage with a protrusion or the groove disposed on the retaining member, respectively.

9. The reciprocating saw of claim 8, wherein the channel has sidewalls angled by an angle A with respect to a base portion of the channel such that the width of the channel decreases towards the base portion.

10. The reciprocating saw of claim 9, wherein the protrusion disposed on the retaining member comprises side sections angled by an angle B with respect to a longitudinal axis of the retaining member such that the width of the protrusion increases towards the retaining member.

11. The reciprocating saw of claim 10, wherein the angle A is substantially equal to the angle B.

12. The reciprocating saw of claim 11, wherein engagement of the protrusion and the channel prevents lateral movement of the retaining member in the channel during use.

13. The reciprocating saw of claim 8, wherein the retaining member is separated from the rear surface when the protrusion engages with the channel during use.

14. The reciprocating saw of claim 8, wherein the groove has a triangular or trapezoidal cross-section.

\* \* \* \* \*